US012780951B2

(12) United States Patent
Vuorenpalo et al.

(10) Patent No.: US 12,780,951 B2
(45) Date of Patent: Nov. 3, 2026

(54) METHOD FOR PRODUCING CATIONIZED CELLULOSE AND CATIONIZED CELLULOSE

(71) Applicant: Kemira Oyj, Helsinki (FI)

(72) Inventors: Veli-Matti Vuorenpalo, Espoo (FI); Jonni Ahlgren, Espoo (FI); Jaakko Hiltunen, Espoo (FI); Anna-Maija Perander, Espoo (FI); Chunlin Xu, Espoo (FI); Sanna Lehto, Espoo (FI); Eija Ahonen, Espoo (FI); Tarja Ikävalko, Espoo (FI)

(73) Assignee: Kemira Oyj, Helsinki (FI)

( * ) Notice: Subject to any disclaimer, the term of this patent is extended or adjusted under 35 U.S.C. 154(b) by 786 days.

(21) Appl. No.: 17/781,963

(22) PCT Filed: Dec. 4, 2020

(86) PCT No.: PCT/FI2020/050817
§ 371 (c)(1),
(2) Date: Jun. 2, 2022

(87) PCT Pub. No.: WO2021/111040
PCT Pub. Date: Jun. 10, 2021

(65) Prior Publication Data

US 2023/0014619 A1    Jan. 19, 2023

(30) Foreign Application Priority Data

Dec. 5, 2019 (FI) ...................................... 20196060

(51) Int. Cl.
*C08B 11/14* (2006.01)
*C08B 1/06* (2006.01)
*C08B 1/08* (2006.01)

(52) U.S. Cl.
CPC ................ *C08B 11/14* (2013.01); *C08B 1/06* (2013.01); *C08B 1/08* (2013.01)

(58) Field of Classification Search
CPC ............ C08B 11/145; C08B 1/06; C08B 1/08
See application file for complete search history.

(56) References Cited

U.S. PATENT DOCUMENTS

| | | | | |
|---|---|---|---|---|
| 5,858,021 | A * | 1/1999 | Sun ........................ | D21C 9/004 162/197 |
| 2007/0253923 | A1* | 11/2007 | Zhang .................... | A61Q 19/00 536/43 |
| 2012/0065388 | A1* | 3/2012 | Yamada .................. | C08B 15/06 536/43 |
| 2024/0141075 | A1* | 5/2024 | Hiltunen ................. | C08B 11/02 |
| 2024/0300839 | A1* | 9/2024 | Vuorenpalo .......... | C02F 11/147 |

FOREIGN PATENT DOCUMENTS

| | | | |
|---|---|---|---|
| CN | 102268096 | A | 12/2011 |
| EP | 2182009 | | 5/2010 |
| EP | 2543681 | A1 | 1/2013 |
| EP | 2684898 | A1 | 1/2014 |
| JP | 2000290302 | A | 10/2000 |
| JP | 2002226501 | A | 8/2002 |
| JP | 2015030718 | A * | 2/2015 |
| WO | 2014203548 | A1 | 12/2014 |

OTHER PUBLICATIONS

Tager et al., "Newtonian Viscosity of Concentrated Solutions of Polymers" Russian Chemical Reviews vol. 36 No. 5 pp. 361-373 (Year: 1967).*

Noureddine Abidi, "Chapter 5: Chemical Properties of Cotton fiber and Chemical Modification" published in Cotton Fiber: Physics, Chemistry, and Biology, David, D Fang, editor, ISBN 978-3-030-00870-3, Chapter 5 pp. 95-97 (Year: 2018).*

English machine translation of JP2015030718, downloaded from patents.google.com (Year: 2015).*

Zhao, Yaoming et al.: Synthesis of quaternary ammonium cationic cellulose ether, Journal of South China University of Technology (Natural Science Edition), vol. 35, No. 8, pp. 83-88, Aug. 31, 2007. English abstract.

Li Zhongzheng et al.: Plant Fiber Resource Chemistry No. 1, China Light Industry Press, pp. 257-259, Jun. 30, 2012.

Office action, search report, and English translations thereof issued on Jan. 28, 2023 by National Intellectual Property Administration, PRC for corresponding application 2020800830275 in China; 20 p.

Aguado, R. et al. Cationic cellulosic derivatives as flocculants in papermaking. In: Cellulose 2017, vol. 24, 3015-3027, <DOI:10.1007/s10570-017-1313-y> p. 3021, second column; Table 2.

Finnish Patent and Registration Office Search report for patent application 2019606, dated on Jun. 22, 2020; 2 p.

* cited by examiner

*Primary Examiner* — Andrea Olson
(74) *Attorney, Agent, or Firm* — Meunier Carlin & Curfman LLC

(57) ABSTRACT

The invention relates to a method for producing cationized cellulose. The method comprises at least preparing a slurry of a cellulosic starting material in an alkaline liquid medium which comprises an organic liquid and performing mercerization of the slurry. The concentration of the cellulosic starting material in the slurry is at least 20 weight-%, calculated as dry from total weight of the liquid medium and the cellulosic starting material. A cationizing agent is added to the slurry after the mercerization step at a cationization temperature, which is less than the boiling point of the alkaline liquid medium, and the cellulose in the slurry is allowed to react with the cationizing agent, preferably under inert atmosphere and a cationized cellulose product is obtained.

13 Claims, No Drawings

METHOD FOR PRODUCING CATIONIZED CELLULOSE AND CATIONIZED CELLULOSE

CROSS REFERENCE TO RELATED APPLICATIONS

This application is a United States National Phase Patent Application of International Patent Application Number PCT/FI2020/050817, filed on Dec. 4, 2020, claiming priority of Finnish national application FI20196060, filed on Dec. 5, 2019, the content of both of which is incorporated herein by reference.

FIELD OF INVENTION

The present invention relates to a method for producing water-soluble cationized cellulose as well as to cationized cellulose according to the preambles of the enclosed independent claims.

BACKGROUND

Cationic synthetic polyelectrolytes, such as polymeric quaternary ammonium compounds, are used in various industrial processes and applications, but their use is linked to environmental issues. Synthetic polyelectrolytes are not biodegradable, and they can be toxic, for example to aquatic lifeforms. There is also a general interest to reduce the use of petroleum-based compounds and to replace them with products than can be obtained from renewable resources.

Cationized cellulose could be an interesting alternative for the synthetic polyelectrolytes, but the present cationization processes of cellulose are associated with various drawbacks which make them less suitable for production in industrial scale. In general, the known processes operate at relatively low consistencies, require extended reaction times and/or plurality of process steps. Furthermore, the produced cationized cellulose often has low charge density and only moderate molecular weight, which is demonstrated by low viscosity of the cationized cellulose solution at a given concentration. It can be concluded that the existing processes are not very efficient, which reduces the interest and possibility to use them in industrial scale for commercial production of cationized cellulose, where high yields, large production outputs and simple overall processes are vital. Consequently, there exists a need for new, more efficient cationization methods for cellulose.

SUMMARY OF INVENTION

An object of this invention is to minimise or possibly even eliminate the disadvantages existing in the prior art.

An object of the present invention is to provide a simple and effective method for producing cationized cellulose preferably at high consistency.

Another object of the present invention is to provide water-soluble cationized cellulose with high degree of substitution, i.e. with high positive charge density.

Yet another object of the present invention is to provide a method for producing water-soluble cationized cellulose with high degree of substitution and/or with high reaction efficiency.

These objects are achieved by the features disclosed in the independent claims. Some preferred embodiments of the present invention are presented in the dependent claims. The features recited in the dependent claims are mutually freely combinable unless otherwise explicitly stated.

The exemplary embodiments presented in this text and their advantages relate to all aspects of the present invention, both to the method and to cationized cellulose, even though this is not always separately mentioned.

Typical method according to the present invention for producing cationized cellulose comprises at least the following steps:

- preparing a slurry of a cellulosic starting material and an alkaline liquid medium which comprises an organic liquid,
- performing mercerization of the said slurry, the concentration of the cellulosic starting material in slurry being at least 20 weight-%, calculated as dry from the total weight of the slurry, i.e. total weight of the liquid medium and the cellulosic starting material, and
- adding a cationizing agent to the said slurry after the mercerization step, at a cationization temperature, which is less than the boiling point of the alkaline liquid medium, and
- allowing the cellulose in the slurry to react with the cationizing agent, preferably under inert atmosphere, and obtaining a cationized cellulose product.

Typical cationized cellulose according to the present invention is obtained by the method according to the invention.

DETAILED DESCRIPTION OF THE INVENTION

Now it has been surprisingly found that when water-soluble cationized cellulose is produced in an alkaline liquid medium, which comprises an organic liquid, the reaction efficiency in the cationization step is significantly and unexpectedly improved. The produced cationic cellulose has a high charge density, i.e. degree of substitution, and it shows, when dissolved, desired viscosity properties, i.e. it has high molecular weight. Furthermore, the method according to the invention enables the production of cationic cellulose at high consistency, which makes it well suitable for production in industrial scale.

First an aqueous slurry of a cellulosic starting material and an alkaline liquid medium is prepared or obtained. Alkaline liquid medium denotes in the present context aqueous liquid phase, which comprises at least one alkaline agent, at least one organic liquid and water. The at least one alkaline agent may be selected from a group consisting of alkali hydroxides, such as NaOH, LiOH or KOH; carbonates, such as $Na_2CO_3$ or $K_2CO_3$; ammonium hydroxide, quaternary ammonium hydroxides and tetramethyl guanidine. Preferably the alkaline agent is selected from alkali hydroxides, more preferably alkaline agent comprises or is sodium hydroxide. The typical pH of the aqueous slurry is high, for example, the pH of the slurry may be >12. The amount of alkaline agent, such as NaOH, may be in a range of 7-18 weight-%, for example 7.5-15 weight-%, calculated from the total weight of the slurry.

The alkaline liquid medium further comprises at least one organic liquid, which may be water-miscible or non-water-miscible, preferably water-miscible. The at least one organic liquid is preferably selected from a group consisting of secondary or tertiary alcohols, such as isopropanol, tert-butanol, sec-butanol, or any of their mixtures. According to one preferable embodiment the organic liquid comprises isopropanol or is isopropanol. It has been observed that when the alkaline medium comprises at least one organic liquid the produced cationized cellulose has a higher degree of substitution, i.e. higher charge density. The amount of organic liquid may be in a range of 30-55 weight-%, preferably 35-50 weight-%, more preferably 40-45 weight-%, calculated from the total weight of the slurry.

In the present context the mercerization step denotes a process step, where the the cellulosic starting material is allowed to interact with the alkaline agent and the organic liquid of the alkaline liquid medium under a pre-determined time, preferably under constant mixing. The mercerization step functions as a pre-treatment step, where the cellulosic starting material is activated for the following cationization step. The mercerization step may be carried out under constant mixing of the slurry comprising the cellulosic starting material and the alkaline liquid medium in a suitable reactor, such as Lödige reactor or any other mixing reactor, which is suitable for mixing highly viscous systems. The mercerization step is performed at the same temperature as the following cationization step or preferably at a temperature below the temperature used in the cationization step.

The temporal duration of the mercerization step, i.e. the pre-determined time under which the cellulosic starting material is allowed to interact with the alkaline agent and the organic liquid of the alkaline liquid medium, is dependent on the used apparatus, alkaline agent amount(s), used cellulosic starting material, etc. In general, the pre-determined time for the mercerization step may be from 10 minutes to 30 hours, preferably from 30 minutes to 20 hours, more preferably from 2 to 10 hours. During the mercerization step the crystallinity of the cellulose starts to disappear, and preferably the mercerization is performed as long that the majority, for example at least 90%, of the crystalline regions of the cellulosic starting material has disappeared or the crystalline regions are completely disappeared.

According to one preferable embodiment the slurry in the mercerization step comprises preferably <40 weight-% of water and >5 weight-% of the organic liquid, calculated from the total weight of the slurry. Preferably, at the mercerization step the weight ratio of the organic liquid to water in the alkaline liquid medium is in a range from 1 to 3.5, more preferably from 1.4 to 3.1. The amount of organic liquid is thus relatively moderate during the mercerization step, which is advantageous for process technical reasons as well as for occupational safety. High excesses of organic liquid are not essential in the present method for obtaining highly cationized cellulose. Furthermore, it is advantageous for the effective mercerization to keep the amount of water in the process as low as possible. It has been observed that the low water amount in the alkaline liquid medium provides optimal results in view of molecular weight of the produced cationized cellulose.

According to one embodiment of the invention the mercerization step of the method is performed at a mercerization temperature ≤50° C., preferably ≤40° C., more preferably ≤35° C. The mercerization step may be performed at a mercerization temperature ≤20° C. or <20° C., preferably ° C., more preferably ≤5° C. The mercerization temperature may be from −15° C. to +20° C., preferably from −10° C. to +10° C., more preferably from −5° C. to +5° C. If the mercerization temperature is lower than the surrounding ambient temperature, the temperature of the slurry may be lowered to the desired mercerization temperature after the preparation of the slurry. Alternatively, the components of the slurry, such as the cellulosic starting material, alkaline agent, organic liquid and water, are separately cooled down to the desired temperature and then mixed with each other. If the mercerization temperature is higher than the surrounding ambient temperature, the temperature of the slurry may be raised to the desired mercerization temperature after the preparation of the slurry. Alternatively, the components of the slurry, such as the cellulosic starting material, alkaline agent, organic liquid and water, are separately heated to the desired temperature and then mixed with each other. In any case, the desired mercerization temperature is maintained preferably throughout the whole mercerization step, for example by using a reactor under cooling or under heating.

According to one embodiment of the invention the temperature at the mercerization step is lower than the temperature at the cationization step, which follows the mercerization step.

The mercerization step is performed at high cellulose concentration. The concentration of the cellulosic starting material in the slurry is at least 20 weight-%, calculated as dry from total weight of the slurry, i.e. total weight of the alkaline liquid medium and the cellulosic starting material. The concentration of the cellulosic starting material in the slurry may be at least 25 weight-%, sometimes at least 30 weight-% or sometimes even at least 35 weight-%, calculated as dry from total weight of the slurry. The concentration of the cellulosic starting material in the slurry may be in a range of 20-40 weight-%, preferably 25-35 weight-%, of the cellulosic starting material, calculated as dry, from the total weight of the slurry. Preferably the cellulose content in the mercerization step is as high as possible in order to provide effective mercerization results.

According to one preferable embodiment of the invention the slurry comprises at the mercerization step 20-40 weight-%, preferably 20-35 weight-%, more preferably 25-30 weight-%, of the cellulosic starting material, calculated as dry, from the total weight of the slurry; 5-30 weight-%, preferably 10-25 weight-%, more preferably 15-20 weight-% of water; and 30-55 weight-%, preferably 35-50 weight-%, more preferably 40-45 weight-% of the organic liquid; and 5-20 weight-%, 5-15 weight-%, preferably 5-10 weight-% of alkaline agent, all percentages being calculated from the total weight of the slurry. In the present context, all chemical amounts are given as active agent, and the water amount includes not only the added water but also the water contained in the various components of the slurry.

One possibility to influence the progress of the mercerization reaction as well as the final properties of the cationized cellulose is a proper selection of the amount of the alkaline agent. If the amount of alkaline agent is high, the reaction proceeds faster, but the viscosity and molecular weight of the produced cationic cellulose may be lower. On the other hand, if the amount of alkaline agent is low, the reaction proceeds slowly, but the viscosity and molecular weight of the produced cationized cellulose may be high. This means that in the present method the mercerization may be optimised according to desire by adjusting the amount of alkaline agent in the liquid medium. According to one embodiment of the invention the alkaline liquid medium at the mercerization step may comprise an alkaline agent, such as alkali hydroxide, preferably sodium hydroxide, in amount of 3-15 mol/kg dry cellulosic starting material, preferably 5-11 mol/kg dry cellulosic staring material, more preferably 6-10 mol/kg dry cellulosic starting material. The amount of alkaline agent is given here as active agent.

After the mercerization step has been carried out, a cationizing agent is added to the slurry. The cationization step is performed at a cationization temperature, which is less than the boiling point of the alkaline liquid medium. The cationization step is preferably performed at an elevated temperature. The temperature during the cationization step is less than the boiling point of the alkaline liquid medium in order to guarantee proper reaction conditions. According to one embodiment the reaction temperature during the cationization step may be <100° C., preferably in a range of 35-80° C., more preferably 40-60° C. In case the temperature at the mercerization step has been lower than the desired reaction temperature at the cationization step, the temperature of the slurry is increased to the cationization temperature. For example, the temperature of the slurry may be gradually raised from the mercerization temperature to the desired reaction temperature at the cationization step.

If the temperature at the cationization step is higher than at the mercerization step, the total amount of the cationization agent may be added to the slurry at the start of the temperature increase to the desired cationization temperature. Alternatively, the cationization agent may be added gradually while the temperature of the slurry is raised to the desired cationization temperature.

According to one preferable embodiment of the invention the cationization step is performed directly after the mercerization step without any intermediate steps of filtration, washing, dewatering and/or drying. The cationization agent can be added straight after the mercerization into the slurry comprising the mercerized cellulose, which makes the process effective and easy to perform.

In the cationization step the slurry is allowed to react with the cationizing agent at the desired cationization temperature, preferably under inert atmosphere, e.g. under nitrogen or argon. The reaction time, i.e. duration of the cationization step, may be from 0.5 to 30 hours, preferably from 1 to 20 hours. In principle, the cationization is continued until the desired charge density is obtained for the cellulose. Preferably the obtained cationized cellulose has a charge density of at least 1.5 meq/g dry, preferably at least 1.75 meq/g dry, more preferably at least 2 meq/g dry, even more preferably at least 2.25 meq/g dry, measured at pH 4. The charge density is determined as described in the experimental part of this application by using AFG Analytics' particle charge titrator.

According to one embodiment of the invention the obtained cationized cellulose has a degree of substitution DS at least 0.32, preferably at least 0.37, sometimes even at least 0.4 or at least 0.5. The degree of substitution can be calculated on basis of the measured charge density value for the obtained cationized cellulose.

The obtained cationized cellulose is at least partly soluble in water, preferably fully soluble in water. The water-solubility can be observed as increased viscosity of the solution comprising the cationized cellulose, especially at higher concentrations. According to one preferable embodiment the viscosity of the cationized cellulose is at least 100 mPas, preferably at least 150 mPas, measured at 1.8 weight-% concentration of cationized cellulose in aqueous solution, comprising 9.1 weight-% of NaCl, at 25° C. The viscosity values are measured by using Brookfield DV-II+ Pro viscometer with a small sample adapter, spindle #18, with maximum possible rotational speed. The viscosity measurement is described in more detail in the experimental part.

According to one embodiment the obtained water-soluble cationized cellulose may have turbidity less than 1000 NTU, preferably less than 500 NTU, 1000 NTU, preferably less than 500 NTU, more preferably less than 250 NTU, especially when the cationized cellulose originated from cellulosic pulp. The turbidity values are measured at 1% concentration, by using HACH, 2100 AN IS Laboratory Turbidimeter.

According to one embodiment of the invention the cationization agent is selected from (3-chloro-2-hydroxypropyl)trimethylammonium chloride (CHPTAC), glycidyltrimethylammonium chloride (GTAC) or any mixtures thereof. Preferably the cationization agent is CHPTAC or a mixture of CHPTAC and GTAC, more preferably CHPTAC, because CHPTAC is easier to handle in industrial scale. It is assumed, without wishing to be bound by a theory, that during the cationization step CHPTAC is converted to GTAC by a reaction with the $OH^-$-ions present in the alkaline liquid medium. Depending on cellulosic starting material and other process parameters, it is possible to use a mixture of various cationization agents at varying dosage ratios. For example, if the starting material is in form of cellulosic fibres, then CHPTAC as cationization agent may be preferable. If the starting material is in form of cellulosic nanofibers or microfibrillar cellulose for producing corresponding cationized products, then cationization agent may be comprised at least partly, in some cases solely, of GTAC.

Use of GTAC as the cationization agent, either alone or together with CHPTAC is advantageous when cationized cellulose with high charge density, for example >3 meq/g, is produced. By using GTAC the amount of used alkaline agent may be reduced in the alkaline liquid medium. Also, a post-addition of GTAC after the completion of the cationization step is possible for increasing the charge density of obtained cationized cellulose.

The amount of cationization agent is usually less than the amount of alkaline agent, calculated as mole/mole ratio, as active agents.

At the cationization step the slurry may comprise 15-30 weight-%, preferably 18-25 weight-% of cellulosic material, calculated as dry; 15-30 weight-%, preferably 20-25 weight-% of water; 25-40 weight-%, preferably 30-35 weight-% of the organic liquid; 3-15 weight-%, 5-10 weight-%, of alkaline agent; and 10-30 weight-%, preferably 15-20 weight-% of cationization agent, all calculated from the total weight of the slurry. All chemical amounts are given as active agent, and the water amount includes not only the added water, but also the water contained in the various components of the slurry. The high cellulose content in the slurry ensures the effective cationization.

At the cationization step the weight ratio of the organic liquid to water may be in a range from 0.5 to 2.5, preferably from 0.75-2, more preferably 1 to 1.55.

According to one embodiment of the invention the viscosity of the slurry may be measured during the mercerization step and/or cationization step. The viscosity of the slurry is an indication of the molecular weight of the cellulose. Preferably the molecular weight of the cellulose is maintained at a high level, which means that the viscosity of the slurry is also maintained high.

After the cationization step the obtained cationized cellulose may be purified in different ways, for example by washing, precipitation and/or filtration. For example, cationic cellulose may be precipitated by using an organic liquid, which is the same or different from the organic liquid included in the alkaline liquid medium, whereafter the precipitated cationized cellulose may be washed with a washing liquid. The organic liquid may be removed by evaporating or decanting. Alternatively, or in addition, the slurry with obtained cationized cellulose may be purified from various residues after the cationization step by using a membrane filtration. Before performing any purification step, the slurry comprising the cationized cellulose may be neutralized. According to one embodiment the cationized cellulose may be purified in a purification step, where the obtained cellulose from the cationization step is first optionally neutralized, and then washed with a washing liquid.

The obtained cationized cellulose, preferably after the purification step, may be dried and ground to a particulate form or dry powder. The dried and ground cationized cellulose may be sieved for separating the different particle size fraction.

The obtained cationized cellulose, preferably after the removal of organic liquid e.g. by evaporation, may alternatively be used as a solution, as an aqueous dispersion or their combination, where a part of the cationized cellulose is dissolved and a part is in form of dispersed material.

The cellulosic starting material may be selected from wood or other cellulose containing biomass. According to one embodiment of the invention the cellulosic starting material is selected from wood or wood-based materials, which may originate from hardwood or softwood or their mixtures. The cellulosic starting material may be cellulosic pulp, such as dissolving pulp or Kraft pulp, softwood Kraft pulp being preferred. According to another embodiment the starting material may be or originate from cellulose containing biomass, such as cotton, or from cellulose containing plant residues from agriculture and/or harvesting. According to one embodiment the starting material may be comprise microfibrillated cellulose or nanocellulose. According to one embodiment mechanical pulp is excluded from the possible starting materials.

According to one preferable embodiment the cellulosic starting material may contain a low amount of lignin, i.e. the cellulosic starting material may be chemical pulp or dissolving pulp, or it may originate from non-wood cellulose containing biomass. Preferably the cellulosic starting material may contain <50 weight-%, preferably <20 weight-%, more preferably <15 weight-%, even more preferably < 10 weight-%, of lignin, and/or <30 weight-%, preferably <25 weight-%, even more preferably <10 weight-%, of hemicelluloses, calculated from the dry weight of the cellulosic starting material. According to one preferable embodiment the cellulosic starting material comprises >65 weight-%, preferably >75 weight-%, more preferably >85 weight-%, sometimes even 90 weight-% or more, of cellulose.

The cellulosic starting material may originate from virgin sources or recycled sources.

EXPERIMENTAL

Some embodiments of the present invention are described in the following non-limiting examples.

Example 1

Hardwood dissolving pulp, refined to 25° SR, was used as raw material. The dissolving pulp was pre-dried to dry content of 87.3 weight-% in a 6 litre Lödige DVT 5 reactor, equipped with mechanical mixers and temperature control jacket. The temperature in the jacket was set to 105° C. using a thermostat bath circulating the warming/cooling medium liquid.

Mercerization Step

Sodium hydroxide solution and isopropanol (IPA) were cooled down in fridge at least overnight. 379 g of pre-dried dissolving pulp at dry content 87.3 weight-% (331 g as dry cellulose) was added into a Lödige reactor. The temperature of the reactor jacket was set to 0° C. 308 g of 30.1 weight-% sodium hydroxide solution and 428 g of isopropanol were mixed together before adding into the reactor. The reaction mixture was mixed 24 h, 100 rpm, temperature 0° C.

Cationization Step

Solution of (3-chloro-2-hydroxypropyl)trimethylammonium chloride solution (CHPTAC, Sigma-Aldrich, 60 weight-% active) was cooled down in a fridge. 572 g of CHPTAC was weighed to a beaker and pumped at 1 l/h speed into the reactor containing an intermediate product from the preceding mercerization step. During the CHPTAC feed the mixing was continued and the temperature in the reactor jacket was maintained at 10° C. At the end of feeding of CHPTAC, the temperature of the reactor jacket was increased to 60° C. After all the CHPTAC had been fed in, an additional dosage of 100 g isopropanol was pumped through the same tube at same speed to flush all CHPTAC into the reactor. After all solutions were in the reactor and temperature of the bath had reached 60° C., the lid of the reactor was closed and nitrogen flow to reactor was started at 1 l/min. Calculation of the reaction time was started at this point. The reaction was continued 22 hours and 40 minutes.

Sample was purified according to a purification protocol as indicated in Table 1a. The purification protocols are described in detail below.

Examples 2-11

Preparation of Examples 2-10 followed the general procedure described in Example 1. Differences between the parameters used in the Examples are explained here below and they can be seen from Tables 1a and 1b.

Examples 2-7, 10 and 11 used unrefined softwood Kraft pulp bales as cellulosic starting material. In Examples 8 and 9 the cellulosic starting material was cotton wool which had been refined as dry with a Kamas hammer mill. The used dry cellulosic starting materials were mechanically teared in small pieces before adding into the Lödige reactor with sodium hydroxide solution and isopropanol.

In Examples 5-7 nitrogen was fed to reactor not only during the cationization but also during the mercerization.

In Example 10 the mercerization step was done at room temperature, around 25° C. The reagents used in mercerization and cationization reaction steps were added at room temperature, without any pre-cooling as in all the other Examples.

Example 11 is a reference example, where no isopropanol was used, only water as a mercerization and reaction medium.

Sample Purification Protocols

Purification Protocol 3×W

When the reaction was finished, a part of the reaction mass was taken from the reactor. The taken part of the reaction mass was dissolved in water in ratio 1:8 (reaction mass to water) and mixed with a magnetic stirrer for 15 min. The solution was poured to isopropanol (IPA) in ratio of 1 g dissolved reaction mass to 50 ml IPA. The solution was filtered using black ribbon filter paper. The filtered cake was washed three times. In two first washing times washing liquid IPA/water 70/30 (by volume) was used. The last washing was made by using washing liquid IPA/water 80/20 (by volume). Washing was done by dispersing the filtered cake in the washing liquid in ratio 'filtered cake to washing liquid' of 1:10 for 15 min. The mixture was filtered using black ribbon filter paper. The last filtered cake was dried overnight at 60° C.

Purification Protocol N3×W

Purification protocol N3×W was made in similar manner as in purification protocol 3×W, but the in water dissolved sample was neutralized to pH 7 using 10 weight-% hydrochloric acid before pouring the sample to IPA.

Purification Protocol NA3×W

Purification protocol NA3×W was made in similar manner as protocol N3×W, but the neutralization was made using 50 weight-% acetic acid to pH 4.3-6.5 before pouring the sample to IPA.

Characterisation of the Produced Cationized Cellulose

Charge density at pH 4 was determined using AFG Analytics' particle charge titrator. Cationized cellulose sample was dissolved as 0.025-0.05 weight-% solution in deionized water, pH was adjusted to 4.0 with 0.1 M acetic acid and titrated using 0.001 N sodium polyethylenesulfonate (PES-Na) solution as the titrant. During titration pH was normally increasing 0.1-0.2 pH units.

Viscosity of 2 weight-% cellulose solution in water in presence of salt was determined using a Brookfield DV-II+ Pro viscometer with a small sample adapter at 25° C., using spindle #18. The viscosity measurement is performed by using maximum possible rotational speed. Cellulose sample was first dissolved in deionized water as 2 w-% solution. Then sodium chloride (NaCl) in weight ratio NaCl:cellulose of 5:1 was added and let to dissolve under mixing before viscosity was measured. This means that the viscosity of the cationized cellulose is measured at 1.8 weight-% concentration of cationized cellulose in an aqueous solution comprising 9.1 weight-% of NaCl.

Conductivity of 0.5 weight-% cellulose solution in deionized water was measured using Knick SE 204 sensor.

Target degree of substitution is the maximal DS that is theoretically possible taken into account the used chemicals and their amounts. Obtained degree of substitution DS was calculated on basis of the measured charge density value, and the reaction efficiency was calculated on basis of the target DS and the calculated obtained DS.

The results for Examples 1-11 are given in Tables 2a and 2b. It can be seen that the reaction efficiency is extremely good. Low conductivity values indicate the purity of the dissolved samples.

It is seen that the amount of used alkali influences the speed of the cationization reaction. With higher amount of alkali (NaOH), the cationization reaction is completed already in a few hours (see Examples 4, 5 and 8), whereas with lower amount of alkali (NaOH) the cationization reaction requires a longer time, which is still acceptable for practical applications (Examples 1, 2 and 7). A reduction in molecular weight can be observed as a reduced viscosity when the reaction time for cationization reaction increases (Examples 2, 3, 5 and 6). The effect is more pronounced when a higher amount of alkali is used (Example 5 and 6). It is further seen that cotton as a starting material reacts somewhat slower than Kraft pulp, which leads different manner of viscosity reduction (Examples 8 and 9).

Example 10 shows that the mercerization step can be performed also at a higher temperature All the examples 1-10, however, produced cationized cellulose which had as good as or superior properties to the conventionally produced cationized celluloses. This can be seen e.g. from Example 11, where water was used instead of isopropanol. The viscosity and the charge density, and thus reaction efficiency as well, became much lower than in Examples 1-10 where isopropanol was used instead of water.

TABLE 1a

Reaction conditions for Examples 1-7.

| | Ex 1 | Ex 2 | Ex 3 | Ex 4 | Ex 5 | Ex 6 | Ex 7 |
|---|---|---|---|---|---|---|---|
| Start material* | HWD | SWK | SWK | SWK | SWK | SWK | SWK |
| dry content, w-% | 87.3 | 92.0 | 92.0 | 92.0 | 92.0 | 92.0 | 92.0 |
| weighed amount, g | 379 | 381 | 381 | 381 | 381 | 381 | 381 |
| Mercerization reactor jacket temp., ° C. | 0 | 0 | 0 | 0 | 0 | 0 | 0 |
| NaOH conc., w-% | 30.1 | 30.1 | 30.1 | 40.0 | 40.0 | 40.0 | 30.1 |
| NaOH sol., g | 308 | 308 | 308 | 308 | 308 | 308 | 308 |
| Isopropanol, g | 428 | 428 | 428 | 621 | 518 | 518 | 432 |
| Nitrogen feed, 1 l/h | no | no | no | no | yes | yes | yes |
| Cationization CHPTAC sol., g | 572 | 572 | 572 | 572 | 572 | 572 | 572 |
| reactor jacket temp. during CHPTAC feeding, ° C. | 10 | | | 10 | 10 | 10 | 10 |
| isopropanol for flushing, g | 100 | 100 | 100 | 40 | 80 | 80 | 80 |
| jacket temp. during reaction, ° C. | 60 | 60 | 60 | 60 | 40 | 40 | 40 |
| Reaction time, h:min | 22:40 | 22:35 | 46:43 | 4:06 | 4:35 | 23:50 | 4:12 |
| Purification | N3xW | 3xW | 3xW | 3xW | NA3xW | NA3xW | NA3xW |

*HWD = hardwood dissolving pulp; SWK = softwood Kraft pulp

TABLE 1b

Reaction conditions for Examples 8-11.

| | Ex 8 | Ex 9 | Ex 10 | Ex 11 (ref.) |
|---|---|---|---|---|
| Start material* | CW | CW | SWK | SWK |
| dry content, w-% | 98.1 | 98.1 | 92.0 | 92.0 |
| weighed amount, g | 260 | 260 | 381 | 381 |
| Mercerization | | | | |
| reactor jacket temp., ° C. | 0 | 0 | 21 | 0 |
| NaOH conc., w-% | 40.0 | 40.0 | 40.0 | 40.0 |
| NaOH sol., g | 224 | 224 | 308 | 308 |
| Isopropanol, g | 550 | 550 | 595 | —** |
| Nitrogen feed, 1 l/h | no | no | no | no |
| Cationization | | | | |
| CHPTAC sol., g | 416 | 416 | 572 | 572 |
| reactor jacket temp. during CHPTAC feeding, ° C. | 10 | 10 | 21 | 10 |
| isopropanol for flushing, g | 80 | 80 | 80 | —*** |
| jacket temp. during reaction, ° C. | 60 | 60 | 40 | 40 |

TABLE 1b-continued

| Reaction conditions for Examples 8-11. | | | | |
|---|---|---|---|---|
| | Ex 8 | Ex 9 | Ex 10 | Ex 11 (ref.) |
| Reaction time, h:min | 4:14 | 23:08 | 23:04 | 23:04 |
| Purification | NA3xW | NA3xW | NA3xW | NA3xW |

*SWK = softwood Kraft pulp; CW = Cotton wool, hammer mill treated
**instead of isopropanol, added water in mercerization 498 g
***instead of isopropanol for flushing, 100 g water used for flushing TABLE 2a

| Results for Examples 1-7 | | | | | | | |
|---|---|---|---|---|---|---|---|
| | Ex 1 | Ex 2 | Ex 3 | Ex 4 | Ex 5 | Ex 6 | Ex 7 |
| Charge density at pH 4, meq/g dry sample(* | 2.4 | 2.52 | 2.52 | 2.03 | 2.11 | 2.12 | 0.35 |
| Conductivity, mS/cm | 0.83 | 0.52 | 0.58 | 0.39 | 0.61 | 0.61 | 0.14 |
| Viscosity, mPas | 494 | 205 | 195 | 222 | 757 | 485 | 1504 |
| Spindle/rotational speed, rpm | 18/6 | 18/12 | 18/12 | 18/12 | 18/3 | 18/6 | 18/1.5 |
| Turbidity, at 1%, NTU | 151 | 51 | 56 | 170 | 150 | 220 | 886 |
| Calculated target DS | 0.89 | 0.84 | 0.84 | 0.84 | 0.84 | 0.84 | 0.84 |
| Calculated obtained DS | 0.61 | 0.66 | 0.66 | 0.48 | 0.50 | 0.51 | 0.06 |
| Theoretical reaction efficiency, % | 68 | 78 | 78 | 57 | 59 | 60 | 7 |

(*average of two titrations

TABLE 2b

| Results for Examples 8-11 | | | | |
|---|---|---|---|---|
| | Ex 8 | Ex 9 | Ex 10 | Ex 11 (ref.) |
| Charge density at pH 4, meq/g dry sample(* | 1.85 | 1.89 | 2.19 | 0.55 |
| Conductivity, mS/cm | 0.52 | 0.54 | 0.60 | 0.24 |
| Viscosity, mPas | 319 | 415 | 190 | 20 |
| Spindle/rotational speed, rpm | 18/6 | 18/6 | 18/12 | 18/100 |
| Turbidity, at 1%, NTU | 670 | 700 | 69 | 257 |
| Calculated target DS | 0.84 | 0.84 | 0.84 | 0.84 |
| Calculated obtained DS | 0.42 | 0.43 | 0.53 | 0.1 |
| Theoretical reaction efficiency, % | 50 | 51 | 63 | 12 |

(*average of two titrations

The invention claimed is:

1. A method for producing water-soluble cationized cellulose, comprising at least steps of:

preparing a slurry of a cellulosic starting material in an alkaline liquid medium which comprises an organic liquid;

performing mercerization of the slurry, wherein the slurry at the mercerization step comprises 20-40 weight-% of cellulosic starting material, calculated as dry; 5-30 weight-% of water; 30-55 weight-% of the organic liquid; and 5-20 weight-% of alkaline agent, calculated from total weight of the slurry, wherein the weight ratio of the organic liquid to water in the alkaline liquid medium is in a range from 1 to 3.5 at the mercerization;

adding a cationizing agent to the slurry after the mercerization step at a cationization temperature after at least 90% of the crystalline regions of the cellulosic starting material have disappeared, which is less than the boiling point of the alkaline liquid medium, wherein at the cationization step the slurry comprises 15-30 weight-% of cellulosic material, calculated as dry; 15-30 weight-% of water; 25-40 weight-% of the organic liquid; 3-15 weight-% of the alkaline agent; and 10-30 weight-% of the cationization agent, all calculated from total weight of the slurry; and allowing the cellulose in the slurry to react with the cationizing agent, and obtaining a water-soluble cationized cellulose product, having a degree of substitution of at least 0.5, a charge density of at least 1.5 meg/g dry, and a turbidity less than 1000 NTU.

2. The method according to claim 1, wherein the cationization is performed directly after the mercerization without an intermediate step of filtration, washing, dewatering and/or drying.

3. The method according to claim 1, wherein at the mercerization step the slurry comprises 20-35 weight-% of cellulosic starting material, calculated as dry;

10-25 weight-% of water;

35-50 weight-% of the organic liquid; and 5-15 weight-% of alkaline agent, all calculated from the total weight of the slurry.

4. The method according to claim 1, wherein at the mercerization a weight ratio of the organic liquid to water in the alkaline liquid medium is in a range from 1.4 to 3.1.

5. The method according to claim 1, wherein the cationization agent for the cationization step is selected from (3-chloro-2-hydroxypropyl)trimethylammonium chloride, glycidyltrimethylammonium chloride and any mixtures thereof.

6. The method according to claim 1, wherein at the cationization step a weight ratio of the organic liquid to water is in a range from 0.5 to 2.5.

7. The method according to claim 1, wherein the alkaline liquid medium comprises an organic liquid, which is selected from a group consisting of secondary or tertiary alcohols and any of their mixtures.

8. The method according to claim 1, wherein the alkaline liquid medium comprises at least one alkaline agent, which is selected from group consisting of alkali hydroxides; carbonates; ammonium hydroxide, quaternary ammonium hydroxides, and tetramethyl guanidine.

9. The method according to claim 1, wherein at the mercerization step the alkaline liquid medium comprises alkali hydroxide in amount of 3-15 mol/kg dry cellulosic starting material.

10. The method according to claim 1, wherein temperature at that mercerization step is lower than the temperature at the cationization step.

11. The method according to claim 1, wherein at the cationization step the slurry comprises 18-25 weight-% of cellulosic material, calculated as dry;

20-25 weight-% of water;

30-35 weight-% of the organic liquid;

5-10 weight-%, of the alkaline agent; and 15-20 weight-% of the cationization agent, all calculated from the total weight of the slurry.

12. The method according to claim 1, wherein the method contains a purification step after the cationization step, and in the purification step the water-soluble cationized cellulose product is first optionally neutralized, and then washed with a washing liquid.

13. The method according to claim 1, wherein the cellulosic starting material contains <50 weight-% of lignin, and/or <30 weight-% of hemicelluloses, calculated from the total dry weight of the cellulosic starting material.

* * * * *